United States Patent [11] 3,583,160

| [72] | Inventor | Koichi Nakamura |
| | | 60, Shinyashiki, Kochi-shi, Kochi-ken, Japan |
| [21] | Appl. No. | 850,903 |
| [22] | Filed | Aug. 18, 1969 |
| [45] | Patented | June 8, 1971 |
| [32] | Priority | Aug. 22, 1968 |
| [33] | | Japan |
| [31] | | 43/71835—43/71836 |

[54] SAFETY MASTER CYLINDER FOR AUTOMOBILES
6 Claims, 4 Drawing Figs.

| [52] | U.S. Cl. | 60/54.6E |
| [51] | Int. Cl. | F15b 7/00 |
| [50] | Field of Search | 60/54.5, 6 E |

[56] References Cited
FOREIGN PATENTS

| 697,509 | 9/1953 | Great Britain | 60/54.5E |
| 819,790 | 1/1952 | Germany | 60/54.5E |

Primary Examiner—Martin P. Schwadron
Assistant Examiner—A. M. Zupcic
Attorney—Holman & Stern ABSTRACT: A safety master cylinder for automobiles, which comprises a master cylinder, a master piston fitted slidably in said master cylinder and operated by a braking lever means, a pushrod coupled with said master piston, and a floating piston interposed between front side and rear side oil outlets provided in front of said master piston within said master cylinder, said pushrod being fitted slidably in said floating piston with a sliding clearance; in which in the case of air extraction from the device said floating piston is made to move due to the oil pressure imparted to the chamber formed between said master piston and floating piston and an oil passage communicating the front and rear spaces of said floating piston is formed separately from said sliding clearance, a first spring is disposed between said master piston and said floating piston, and a second spring is disposed between said floating piston and an end of said master cylinder, said end being opposite to the piston of said master piston. The strengths of said springs are selected in such a manner that the force with which the first spring presses the floating piston at the moment when the master piston has moved for its complete stroke toward the floating piston is equal to the force with which the second spring presses said floating piston at the moment when said floating piston has moved for its complete stroke toward the right hand end of the interior of the master cylinder.

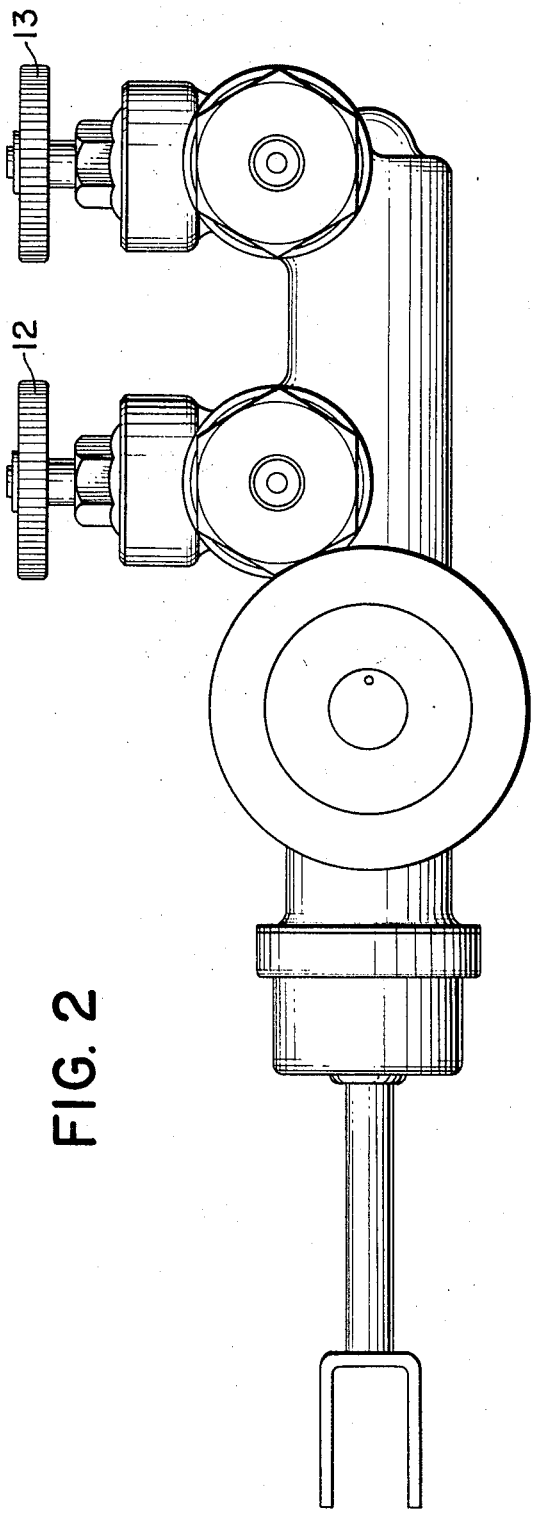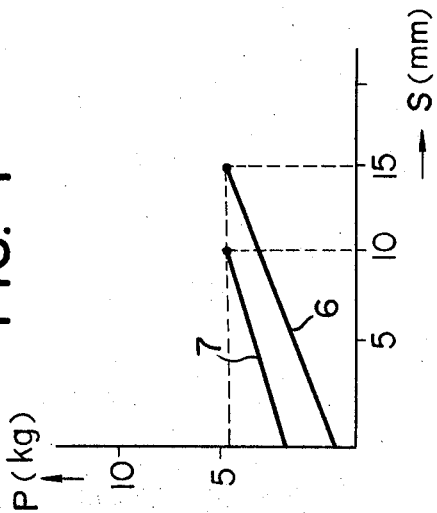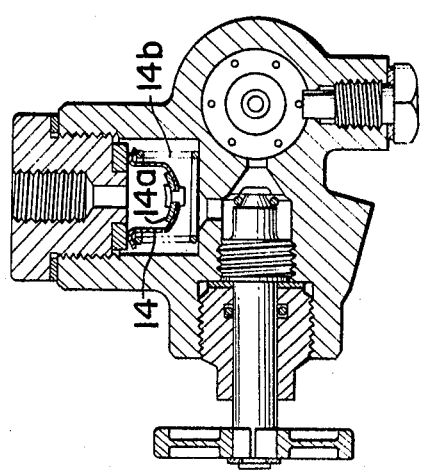

SAFETY MASTER CYLINDER FOR AUTOMOBILES

BACKGROUND OF THE INVENTION

The present invention relates to improvements in a safety master cylinder for automobiles.

In hydraulic braking means and the like of automobiles, a safety master cylinder has been conventionally used, said master cylinder including a master piston fitted slidably therein and operated by a braking means, a pushrod coupled with said master piston, and a floating piston interposed between front side and rear side oil outlets provided in front of said master piston within said master cylinder, with said pushrod being fitted slidably in said floating piston with a sliding clearance.

However, in the conventional safety master cylinders, since a particular device for air extraction from the master cylinder is necessary, the construction is relatively complicated, and, moreover, air extraction at the spaces at the front and rear sides of the cylinder cannot be rapidly attained. Furthermore, safety in the braking operation cannot be sufficiently secured.

SUMMARY OF THE INVENTION

It is therefore the primary object of the present invention to provide an effective safety master cylinder for automobiles, which is capable of carrying out rapidly air extraction at both spaces provided in the front and rear sides of the floating piston, without necessitating a particular device for air extraction from the master cylinder.

It is another object of the invention to provide an effective safety master cylinder for automobiles, said cylinder capable of sufficiently securing safety at the braking operation.

The foregoing objects and other objects as well as the characteristic features of the invention will become more apparent and more readily understandable by the following description when read in conjunction with the accompanying drawings, in which the same or equivalent members are designated by the same reference numerals.

BRIEF DESCRIPTION OF THE DRAWINGS

FIG. 2 is a plan view of the example shown in FIG. 1;

FIG. 3 is a sectional view along line III–III in FIG. 1; and

FIG. 4 shows characteristic curves of the springs used in the invention.

DETAILED DESCRIPTION OF THE INVENTION

Figure 1:
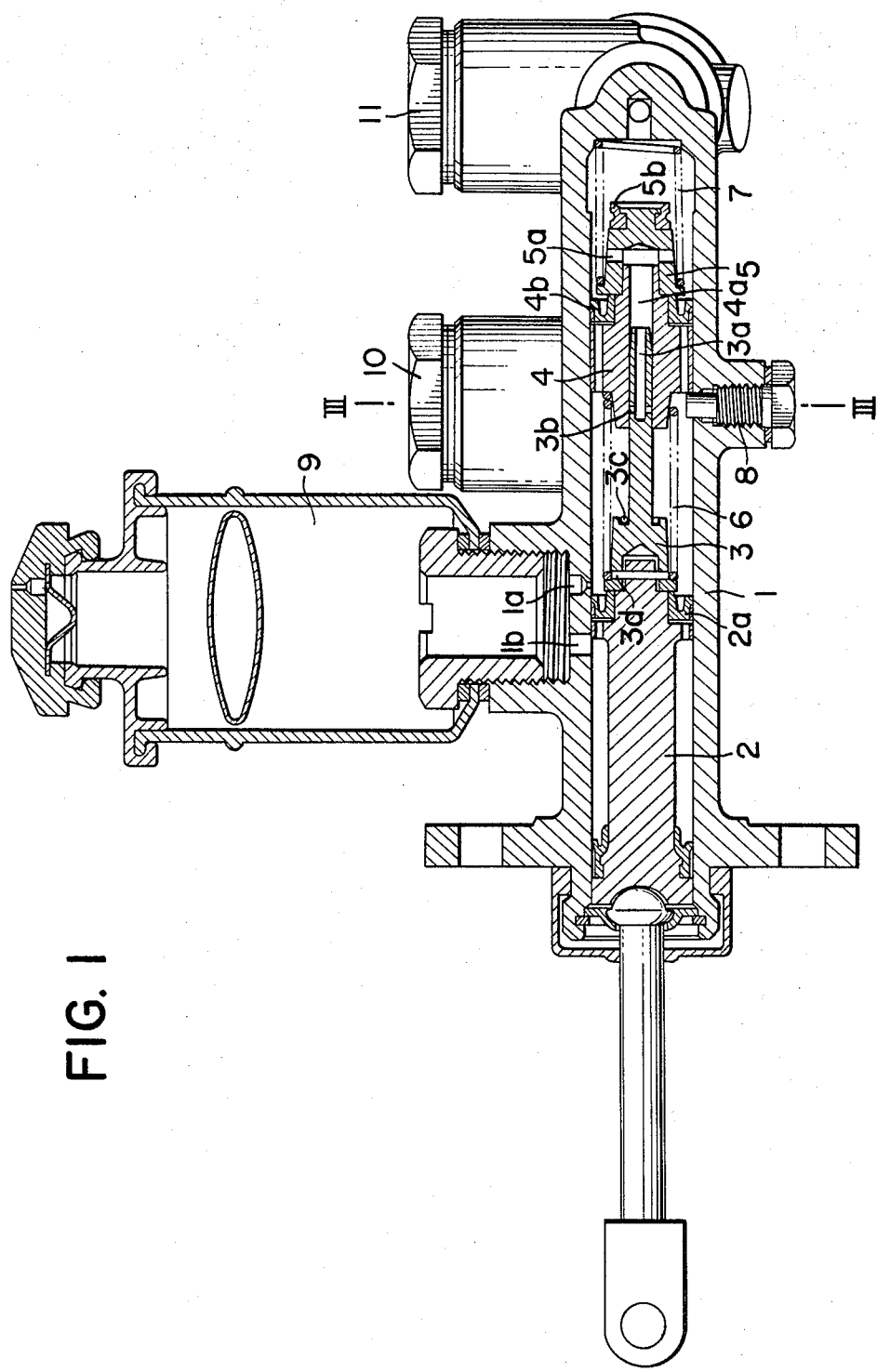
FIG. 1 is an elevational view, partly in section, of an example of the invention.

Referring now to FIGS. 1 to 3 for the description of an example of the present device, reference numeral 1 designates a cylinder, 2 a master piston pressed by the operation of a brake pedal (not shown), 2a a piston cup, and 3 a pushrod coupled with the leading end of the master piston 2 by means of a pin 3d, with the pushrod 3 being mechanized so as to slide, with a clearance, through an oil passage 4a of a floating piston 4 in accordance with the operation of the master piston 2. At the right-hand end of the pushrod 3 there are communicating apertures 3a and 3b, with the aperture 3b being normally closed by a wall of the oil passage 4a of the floating piston 4 and said aperture 3a being opened to the oil passage 4a of the floating piston 4. The pushrod 3 may be formed integrally with the master piston 2. The floating piston 4 is provided with an oil passage 4a nearly at the center thereof, an oil-sealing packing 4b at the outside thereof and a piece 5 attached to the right-hand end thereof. This piece 5 is provided with an oil passage 5a which is always communicated with the oil passage 4a of the floating piston 4 and opened to a chamber formed by the floating piston 4 and the right-hand end of the cylinder 1. Numerals 3c and 5b, respectively, represent packings. Although the floating piston 4 receives a force of a spring 6 inserted between the piston 4 and the pushrod 3 connected with the master piston 2 and a force of a spring 7 inserted between the piece 5 fitted onto the floating piston 4 and the cylinder proper 1, the floating piston 4 is supported at a definite position by means of a stopper 8, because the spring 7 is selected so as to be stronger than the spring 6 at the time of fixing operation.

In FIG. 1, numeral 1a represents an oil port adapted for the supply of oil from an oil tank 9 into the cylinder 1 or return the oil from the cylinder 1 into the tank 9 and provided in front of the piston cup 2a, while numeral 1b designates an oil-replenishing port provided at the rear side of the piston cup 2a. The oil tank is provided therein with a ring member floating on the oil. The ring member is utilized to detect the oil level in a situation in which the tank is of a transparent material. Reference numeral 10 represents an oil outlet of the master cylinder with said outlet supplying oil to a front side wheel cylinder, 11 an oil outlet of the master cylinder. The outlet 11 supplies oil to a rear side wheel cylinder 12 a shutoff valve of the oil outlet 10, and 13 a shutoff valve of the oil outlet 11.

Air-extracting operation of the apparatus as described above is conventionally effected after assembling the present device as illustrated in FIGS. 1, 2 and 3, and the operation is effective by consecutively supplying pressurized oil into the oil tank 9.

A part of the brake oil supplied consecutively to the oil tank 9 in the present device is introduced into the cylinder 1 via the oil port 1a, while the other part thereof is charged via the oil replenishing port 1b to push the master cup 2a from its back and enters into the cylinder 1, thereafter forcing to open a check valve 14 and reaching the front side wheel cylinder via the oil outlet 10 of the master cylinder, to expel air out of an air bleeder valve of the front side wheel cylinder thus to complete the air extraction of the front side system. Simultaneously, since the pressurized oil is filled between the master piston 2 and floating piston 4 (because a quantity of the pressurized oil supplied into the cylinder proper 1 from the oil tank 9 is larger than that of the pressurized oil discharged out of the bleeder valve), the floating piston 4 is moved in a rightward direction due to the pressurized oil. In this instance, the master piston 2 and the pushrod 3 coupled therewith are immobile, so that the aperture 3b of the pushrod 3 is opened to the left-hand chamber of the floating piston 4 within the cylinder 1.

The aperture 3b is communicated with the right-hand chamber of the floating piston 4 within the cylinder 1 via the aperture 3a, oil passage 4a, and oil passage 5a.

The right-hand chamber and left-hand chamber of the floating piston 4 are thus intercommunicated, so that the pressurized oil is fed to the rear side wheel cylinder via the check valve and the oil outlet of the master cylinder, whereby air is expelled out of the air bleeder valve of the rearside wheel cylinder to complete the air extraction of the rearside system.

Air extraction can thus be completed thoroughly in both the front and rear systems due to the supply of brake oil under pressure. Upon completion of the above-mentioned air extraction, the air bleeder valves are closed both in the front and rear systems.

When, instead of the forcible supply of brake oil, the brake pedal is stepped on for air extraction, a sliding clearance between the floating piston 4 and the leading end of the pushrod 3 corresponds to the oil port 1a and the left-hand chamber of the floating piston 4 corresponds to the oil replenishing port 1b, so that air can be extracted from chambers on both sides of the floating piston 4 in the same way as in the case of ordinary master cylinders.

Now, when the brake pedal is stepped on, the master piston 2 is advanced toward the right-hand direction in FIG. 1 whereby oil pressure is transmitted to the wheel cylinder from both the front side oil outlet 10 and rearside oil outlet 11, thereby causing a braking operation. In this case, there is a clearance between the oil passage 4a of the floating piston 4 and the periphery of the leading end of the pushrod 3, so that oil pressures on both front and rear sides are always the same irrespective of the strengths of the springs 6 and 7. If any oil leakage is caused on the front side during a braking operation, the master piston 2 is moved in the right-hand direction together with the pushrod 3 coupled therewith, which results in that the packing 3c provided on the pushrod 3 is contacted with the left-hand end of the floating piston 4, thereby closing the sliding clearance between the leading end of the pushrod 3 and the oil passage 4a of the floating piston 4, to break the intercommunication between the left-hand chamber and right-hand chamber of the floating piston 4, and further to press the floating piston 4, so that a braking operation can be effected only from the rear side, because an oil pressure is generated therein due to the operation of the oil shielding packing 4b and to said pressing of the floating piston 4.

Similarly, when oil leakage is caused on the rear side, the floating piston 4 is moved in right-hand direction due to the feeding of oil caused by the advance of the master piston 2, because the sliding clearance between the leading end of the pushrod 3 and the oil passage 4a of the floating piston 4 is extremely small as compared with the caliber of the cylinder 1, and the packing 5b of the piece 5 fixed ahead thereof contacts with the right-hand end of the interior of the cylinder to close the oil outlet adapted to the rear side, so that a braking operation can be effected only from the front side as an oil pressure is generated therein. In this instance, the master piston 2 and the pushrod 3 are advanced until the packing 5b of the piece 5 fixed at the right-hand end of the floating piston 4 is brought in contact with the right-hand end of the interior of the cylinder, thereby to close the oil outlet to the rear side and generate an appropriate oil pressure in the left-hand chamber of the floating piston 4, so that the aperture 3b is always closed by the periphery of the oil inlet 4a of the floating piston 4.

Shutoff valves 12 and 13 which are respectively provided on the front side and rear side act to close, in the event of oil leakage, an oil passage on the side where such a trouble has been generated, and thereby to insure braking operation without trouble thereafter on the remaining side. The numeral 14 designates a check valve. The supply of oil is effected by opening a valve 14a at the center thereof, while the oil is fed back, because a check valve spring 14b is pushed back due to pressurized oil by the whole check valve means. Although the check valve is adapted primarily to leave a residual pressure within the master cylinder in accordance with the strength of the check valve spring, it also serves to prevent the invasion of air into the cylinder in the event of oil leakage from the side thus troubled.

As has been described hereinbefore in connection with FIGS. 1, 2 and 3, there is provided, according to the present device, a sliding clearance between the floating piston and the leading end of the pushrod, so that oil pressures generated on the front and rear sides are the same irrespective of the strengths of the springs on both sides. In the case of air extraction by supplying braking oil under pressure, the floating piston is automatically moved rightward by virtue of the pressurized oil fed from the oil tank, thus forming an oil passage intercommunicating the front side chamber and rear side chamber in the interior of the cylinder, with said oil passage being provided separately from said sliding clearance, so that a particular means adapted exclusively for air extraction need not be operated as in the conventional counterparts of the present device. Furthermore, air can be extracted simultaneously and quickly from the front and rear sides of the floating piston, whereby it becomes possible to decrease the operational time.

Although, in the above described specific example of the present device, the phrases "front side chamber" and "rear side chamber" have been employed for calling, respectively, a chamber between the master piston 2 and the floating piston 4 and a chamber between the floating piston 4 and the right-hand end of the cylinder, it will be apparent that an exchange in the appellations has no relation whatever with the successful effects of this device described in the foregoing.

In the example illustrated in FIGS. 1 to 3, the total stroke between the master piston 2 as well as the pushrod 3 coupled therewith and the floating piston 4, and the total stroke between the floating piston 4 and the right-hand end of the interior of the cylinder are determined according to the maximum quantity of oil supplied to the wheel cylinder and further depend on the type of a structure of a brake mechanism employed. The device of FIG. 1 is illustrated on the assumption that the former stroke is 15 mm. long and the latter stroke 10 mm. long, by way of example. FIG. 4 shows the characteristic curves of the springs 6 and 7 used in the above device.

In the above device, the spring 7 is made to be stronger than the spring 6 during fixing operation for fixing the floating piston 4 at a specified position. Now, when a braking operation is effected by generating hydraulic pressure on a left-hand chamber of the floating piston 4 with advancement of the master piston 2 by stepping on a brake pedal (not shown), and thereby also generating the same hydraulic pressure on a right-hand chamber of the floating piston 4 by moving the floating piston 4, a quantity of supplied oil of the left-hand chamber of the floating piston 4 may become larger than that of the right-hand chamber due to some reasons such as abrasion of a lining, for instance.

In such an instance, if the brake pedal is stepped on for a certain period of time for continuous braking operation, the packing 3c of the pushrod 3 and the left-hand end of the floating piston 4 are contacted with each other, in spite of the fact that the floating piston 4 is pressed leftward and the master piston 2 and pushrod 3 have not moved for a complete stroke because of the fact that the spring 7 is stronger than the spring 6 and, moreover, the brake oils in the chambers on both sides of the floating piston 4 can communicate with one another through the slide clearance between the oil passage 4a of the floating piston 4 and the leading end of the pushrod. In the above-mentioned contacting between the packing 3c and the left-hand end of the floating piston 4 is established, oil pressure of the left-hand chamber of the floating piston 4 will not be elevated even when more intense pressure is applied to the brake pedal.

The same phenomenon will be caused when both right and left-hand chambers of the floating piston 4 have the same large quantity of supplied oil. If, in this instance, arrangement of various members is selected so that the spring 6 becomes stronger than the spring 7 at the moment just near the end of one complete stroke in order to overcome the undesirable effect, then the floating piston 4 will be moved toward the right-hand end of the cylinder and close the oil passage with the packing 5b fixed to the piece 5. The oil pressure of the right-hand chamber of the floating piston 4 will not be elevated even by the application of greater pressure to the brake pedal.

In order to eliminate the above described deficiencies, according to the invention, a provision is made in the present device for making the spring 7 stronger than the spring 6 to insure a definite position for the floating piston 4 with respect to the stopper 8. In this case, the force with which the spring 6 presses the floating piston 4 at the moment when the master piston 2 and the pushrod 3 coupled therewith have moved for one complete stroke to the floating piston 4 is made equal to the force with which the spring 7 presses the floating piston 4 at the moment when the floating piston 4 has moved for one complete stroke to the right-hand end of the interior of the cylinder.

According to the above-mentioned design of the springs 6 and 7, even when the master piston 2 including the pushrod 3 coupled therewith or the floating piston 4 does not move along its complete stroke, the same state as that in which at least one of said members 2 and 4 has moved along its complete stroke would not occur, whereby safety of the braking operation is sufficiently secured, thus causing always an effective braking.

I claim:

1. In a safety master cylinder for automobiles including a master cylinder, a piston in the master cylinder, an oil pressure means communicating with front and rear portions of the master cylinder in a normal state, a floating piston within the cylinder in front of the master piston, and oil chambers provided in front and rear parts of the floating piston respectively, the front oil chamber having an oil supply port to be connected to one of the braking systems and the rear oil chamber having another oil supply port to be connected to another of the braking systems, the improvement being that a front end portion of the master piston is slidable with a clearance in the floating piston to normally communicate with both oil supply ports, at least one of the confronting end portions of the master piston and the floating piston and at least one of the front end portions of the floating piston and a confronting inner wall of the master cylinder being provided respectively with shutout means adapted to shut out communication between the oil ports at the time when the master piston has completed its whole stroke with respect to the inner wall of the master cylinder.

2. The safety master cylinder for automobiles as claimed in claim 1 in which the master piston is provided at its front end portion with a cup, and the master cylinder is provided with an oil tank at the outside of the cylinder and with oil ports at the front and rear side portions of the cup, said oil ports being in communication with the oil tank, the front oil part serving to feed oil from the tank into the rear side portion of the floating piston or to return the oil from the rear side portion into the tank and the rear oil port serving to supply oil from the tank into the rear side portion of the floating piston via the rear side portion of the cup.

3. The safety master cylinder for automobiles as claimed in claim 1 in which the oil supply ports of the oil chambers provided in the front and rear sides of the floating piston respectively are provided with check valves.

4. The safety master cylinder for automobiles as claimed in claim 1 in which the oil supply ports of the oil chambers provided in front and rear sides of the floating piston are respectively provided with shutoff valves, each of which is adapted to close oil passage in the event of oil leakage in the oil chamber provided with the valve.

5. The safety master cylinder for automobiles as claimed in claim 1 in which the master piston is provided at its front portion with a pushrod, said pushrod being slidably fitted with a clearance in the floating piston at a position between the front and rear oil supply ports, said pushrod having an oil passage which communicates with the front and rear sides of the floating piston irrespective of the clearance in the situation in which the floating piston is advanced with respect to the master piston.

6. The safety master cylinder for automobiles as claimed in claim 1 including a first spring positioned between the master piston and the floating piston, and a second spring positioned between the floating piston and the front inner face of the master cylinder, said springs being designed so that the force imparted by the first spring to the floating piston at the moment when the master piston has completed its stroke between the master piston and the floating piston is equal to the force imparted by the second spring to the floating piston at the moment when the floating piston has completed its stroke between the floating piston and the front inner face of the master cylinder.